United States Patent
Hagen et al.

(10) Patent No.: US 11,724,462 B2
(45) Date of Patent: Aug. 15, 2023

(54) METHOD FOR SETTING UP A JOINING APPARATUS FOR JOINING A LIGHT LENS TO A HOUSING OF A MOTOR VEHICLE LIGHTING ARRANGEMENT

(71) Applicant: Hella GmbH & Co. KGaA, Lippstadt (DE)

(72) Inventors: Ansgar Hagen, Salzkotten (DE); Daria Wilke, Salzkotten (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 17/722,096

(22) Filed: Apr. 15, 2022

(65) Prior Publication Data

US 2022/0234304 A1    Jul. 28, 2022

Related U.S. Application Data

(63) Continuation of application No. PCT/EP2020/077635, filed on Oct. 2, 2020.

(30) Foreign Application Priority Data

Oct. 16, 2019   (DE) ...................... 10 2019 127 867.8

(51) Int. Cl.
*B29C 65/78*   (2006.01)
*F21S 41/20*   (2018.01)
(Continued)

(52) U.S. Cl.
CPC .......... *B29C 65/7802* (2013.01); *B29C 65/06* (2013.01); *B29C 65/103* (2013.01);
(Continued)

(58) Field of Classification Search
CPC . B29C 65/7802; B29C 65/7841; B29C 65/06; B29C 65/103; B29C 65/48; B29C 65/1632; B29C 66/301; F21S 41/28
See application file for complete search history.

(56) References Cited

U.S. PATENT DOCUMENTS

| | | | |
|---|---|---|---|
| 2006/0015211 | A1 | 1/2006 | Kolb et al. |
| 2006/0107507 | A1 | 5/2006 | Brose et al. |

FOREIGN PATENT DOCUMENTS

| | | | |
|---|---|---|---|
| DE | 10242710 | A1 | 4/2004 |
| DE | 102010024169 | A1 | 12/2011 |

(Continued)

OTHER PUBLICATIONS

International Search Report dated Dec. 22, 2020 in corresponding application PCT/EP2020/077635.

*Primary Examiner* — Daniel McNally
(74) *Attorney, Agent, or Firm* — Muncy, Geissler, Olds & Lowe, P.C.

(57) ABSTRACT

A method for setting up a joining apparatus for joining a light lens to a housing of a motor vehicle lighting arrangement. A first virtual model is created of the joining apparatus with a light lens and a housing received therein, a relative arrangement of the light lens to the housing corresponds to a target arrangement. A plurality of virtual models are created of the joining apparatus with the light lens and the housing received therein. The relative arrangement of the light lens to the housing deviates from the target arrangement in each case by means of virtual displacement of the adjuster. A target displacement is calculated of an adjuster on the basis of a functional relationship calculated and the relative arrangement in the test construction unit measured. A light lens is joined to a housing in the target arrangement by displacing the adjuster by the target displacement.

10 Claims, 3 Drawing Sheets

(51) Int. Cl.
    *B29C 65/06*          (2006.01)
    *B29C 65/10*          (2006.01)
    *B29C 65/48*          (2006.01)
    *B29C 65/00*          (2006.01)
    *B29L 31/30*          (2006.01)
    *B29L 31/00*          (2006.01)

(52) U.S. Cl.
    CPC .......... *B29C 65/48* (2013.01); *B29C 65/7841* (2013.01); *B29C 66/301* (2013.01); *B29C 66/542* (2013.01); *F21S 41/28* (2018.01); *B29L 2031/30* (2013.01); *B29L 2031/747* (2013.01)

(56) References Cited

FOREIGN PATENT DOCUMENTS

| | | | | |
|---|---|---|---|---|
| DE | 102016116122 | A1 | 3/2018 | |
| DE | 102016116131 | A1 * | 3/2018 | .............. B23P 19/04 |
| DE | 102018201416 | A1 * | 8/2019 | ............. B29C 65/16 |
| DE | 102018201416 | A1 | 8/2019 | |
| EP | 1935714 | B1 | 3/2010 | |
| IT | PD20140170 | A1 | 12/2015 | |

* cited by examiner

METHOD FOR SETTING UP A JOINING APPARATUS FOR JOINING A LIGHT LENS TO A HOUSING OF A MOTOR VEHICLE LIGHTING ARRANGEMENT

This nonprovisional application is a continuation of International Application No. PCT/EP2020/077635, which was filed on Oct. 2, 2020, and which claims priority to German Patent Application No. 10 2019 127 867.8, which was filed in Germany on Oct. 16, 2019, and which are both herein incorporated by reference.

BACKGROUND OF THE INVENTION

Field of the Invention

The present invention relates to a method for setting up a joining apparatus for joining a light lens to a housing of a motor vehicle lighting arrangement, wherein the joining apparatus has a holding device for receiving the light lens and a receiving device for receiving the housing, wherein the holding device and the receiving device are movable in translation and/or rotation relative to one another by an adjuster.

Description of the Background Art

When installing motor vehicle lighting arrangements in a vehicle body, an essential requirement is that the joint and contour run between the light lens of the installed lighting arrangement and the body corresponds to a predetermined course with as few deviations as possible. The connection to the body is usually made via the housing of the lighting arrangement, so that a reference point system for the production of the lighting arrangement is usually assigned to the housing. The present invention addresses the reproducible, dimensionally accurate joining of light lenses and housings in order to meet the aforementioned requirements for the installation dimensions of lighting arrangements.

A cause for deviations from the target dimensions of the lighting arrangement lies in the resulting scattering from the single-part production of housing and light lens and/or the prefabrication, which passes through to the final, joined construction unit. This problem is solved in the prior art, for example, using methods known from publications DE 10 2010 024 169 A1 or DE 10 2016 116 122 A1.

For example, DE 10 2010 024 169 A1 teaches to provide tolerance compensation ranges injected in the area of the joining surfaces on the light lens and on the housing during production and to remove these tolerance compensation ranges before joining the light lens with the housing to the extent necessary in order to be able to join a dimensionally accurate construction unit.

Another cause for a lack of dimensional accuracy of the lighting arrangement can be an imprecise setup of the joining apparatus. For example, the light lens and housing are joined together as plastic components by means of a welding process, such as friction welding or heating element welding. For this purpose, the light lens is received in a holding device and the housing in a receiving device, wherein holding and receiving device are movable in translation and/or rotation relative to one another by suitable adjuster. The setup procedure of the joining apparatus involves in particular the determination of a suitable relative positioning of the holding and receiving device to one another, i.e., a positioning, which corresponds to a target arrangement of the received light lens to the received housing and enables a dimensionally accurate joining of the two components.

In state-of-the-art joining methods, the setup is carried out as follows. After equipping the joining apparatus with holding and receiving device, a light lens and a housing are inserted into these and then the adjuster are moved to a starting position, resulting in a rough pre-positioning of the light lens to the housing. In this starting position of the adjuster, the light lens and housing are joined together, and the resulting construction unit is then measured with regard to the arrangement of the light lens to the housing, which represents the body-side reference point system. On the basis of this measurement protocol, the adjuster of the joining apparatus are then readjusted in order to further approximate the arrangement of light lens to housing to the required target arrangement. This readjustment is carried out in the prior art solely on the basis of the practical experience of the responsible operating personnel, and due to the large number of degrees of freedom in the relative positioning of holding and receiving devices, for example three translatory and one rotational degree of freedom, it is usually necessary to carry out a large number of attempts until the adjuster have been approximated by the required target displacement. Thus, the process of experimentally joining a construction unit and its subsequent measurement must be repeated many times in order to ultimately set up the joining apparatus in such a way that a dimensionally accurate joining of a lighting arrangement to it is possible.

This state-of-the-art set-up process is associated with a disadvantageously high expenditure of time and effort. In addition, with the method used, the optimal target displacement of the adjuster for dimensionally accurate joining can only be approximated, so that there is an increased risk that the joined lighting arrangement has an intolerable mismatch, for example due to possible scattering from the production of single parts.

SUMMARY OF THE INVENTION

It is therefore an object of the present invention to provide an alternative method for setting up a joining apparatus for joining a light lens to a housing of a motor vehicle lighting arrangement, which overcomes the aforementioned disadvantages of the prior art.

In an exemplary embodiment, the invention includes at least the following method steps: creating a first virtual model of the joining apparatus with a light lens received therein and with a housing received therein, wherein the relative arrangement of the light lens to the housing corresponds to a target arrangement; creating a plurality of virtual models of the joining apparatus with the light lens received therein and with the housing received therein, wherein the relative arrangement of the light lens to the housing deviates from the target arrangement in each case by means of virtual displacement of the adjuster; calculating a functional relationship between the relative arrangements of the light lens to the housing and the displacement of the adjuster on the basis of the virtual models created in the first and second method steps; joining a light lens to a housing to form a test construction unit at a starting position of the adjuster; measuring the relative arrangement of the light lens to the housing in the test construction unit; calculating target displacement of the adjuster on the basis of the functional relationship calculated in the third method step and the relative arrangement in the test construction unit measured in the fifth method step, wherein it is possible to join a light lens to a housing in the target arrangement by displacing the adjuster by the target displacement; and displacing the adjuster from the starting position by the target displacement.

The invention is based on the idea of replacing the trial-and-error approach used in the prior art to determine the optimal position of the adjuster by a simulation-based calculation. For this purpose, in a first method step, a virtual model of the joining apparatus, i.e., in particular the holding device, the receiving device and the adjuster, is generated with the light lens and housing mounted therein. The creation of such a computer model does not require much effort if the joining apparatus and the components to be joined were characteristically designed using CAD methods and thus already exist as virtual objects.

The starting point of the simulation is a target arrangement of the received light lens to the received housing, in which the two virtual components represent a dimensionally accurate unit. This target arrangement should be assumed, for example when using a friction welding process, at the end of the friction process. Subsequently, the virtual adjuster of the simulated joining apparatus are displaced, resulting in a corresponding displacement and/or rotation of the virtual holding and/or receiving device and thus a deviation of the relative arrangement of the light lens to the housing from the target arrangement. The relative arrangements are quantified, for example by determining the position of defined receptor points on the surface of the light lens in relation to reference points on the housing. In the next method step, a functional relationship between these relative arrangements and the associated displacement of the adjuster is determined, wherein the methodology used for this is explained in more detail below.

After equipping the real joining apparatus with holding device and receiving device, the adjuster are in an undefined starting position and the setter now has the task of displacing the adjuster in such a way that a received light lens is brought into a target arrangement to a received housing. This desired displacement is called target displacement. For their determination, a light lens is joined to a housing in the starting position of the adjuster on a trial basis. Subsequently, a measurement of the resulting test construction unit is carried out, and the relative arrangement of the light lens to the housing is quantified.

On the basis of the previously determined functional relationship between the relative arrangements of the light lens to the housing and the displacement of the adjuster, it is thus possible to directly infer regarding the target displacement of the adjuster. In the last method step, the adjuster are adjusted from their starting position by the target displacement, so that holding and receiving devices are in the desired position to join a light lens to a housing in a target arrangement. Thus, the joining apparatus is optimally set up and is ready for a series of lighting apparatuses to be produced. Compared to the complex set-up method from the prior art, which requires a large number of experimentally joined structural units, according to the invention only a single test construction unit must be joined and measured, and the determination of the optimal adjustment of the adjuster is then carried out directly with the help of the simulation results.

A linear approximation can be carried out when calculating the functional relationship between the relative arrangements of the light lens to the housing and the displacement of the adjuster. In particular, an inhomogeneous system of linear equations is established, wherein the variables of the linear system represent the displacement of the adjuster, and the constant terms of the linear system represent the relative arrangement of the light lens to the housing. When calculating the target displacement of the adjuster, this linear system is then solved, wherein the constant terms of the linear system represent the relative arrangement measured in the preceding method step on the test unit. This procedure is explained in more detail below.

As already mentioned, it is advantageous when creating the first virtual model to define receptor points on the light lens and reference points on the housing, wherein the relative arrangement of the light lens to the housing is described on the basis of the relative position of the receptor points to the reference points. When measuring the relative arrangement of the light lens to the housing of the real test construction unit, the relative positions of the receptor points on the light lens to the reference points on the housing are preferably measured accordingly.

The displacement that can be carried out by the adjuster corresponds to the following relative movements of the light lens received in the holding device to the housing received in the receiving device: Translation in the vertical direction; Translation in two directions in a horizontal plane, and Rotation about the vertical direction as an axis of rotation.

In practice, such a restriction of the degrees of freedom of the adjuster leads to a suitable compromise of the adjustment options necessary for positioning the light lens and housing and to a low susceptibility to errors of the setup method according to the invention.

Preferably, a device for carrying out a friction welding process or a heating element welding process is used as a joining apparatus, which are extremely suitable for joining the plastics used for the light lens and the housing. Alternatively, the joining apparatus may also be designed, for example, for carrying out an adhesive process.

For measuring the relative arrangement of the light lens to the housing, a coordinate measuring instrument can be used.

Furthermore, the invention relates to a method for joining a light lens to a housing of a motor vehicle lighting device arrangement by means of a joining apparatus, wherein the setup of the joining apparatus is carried out by means of the setup method according to the invention, so that the subsequent joining of the light lens with the housing is carried out in target arrangement.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
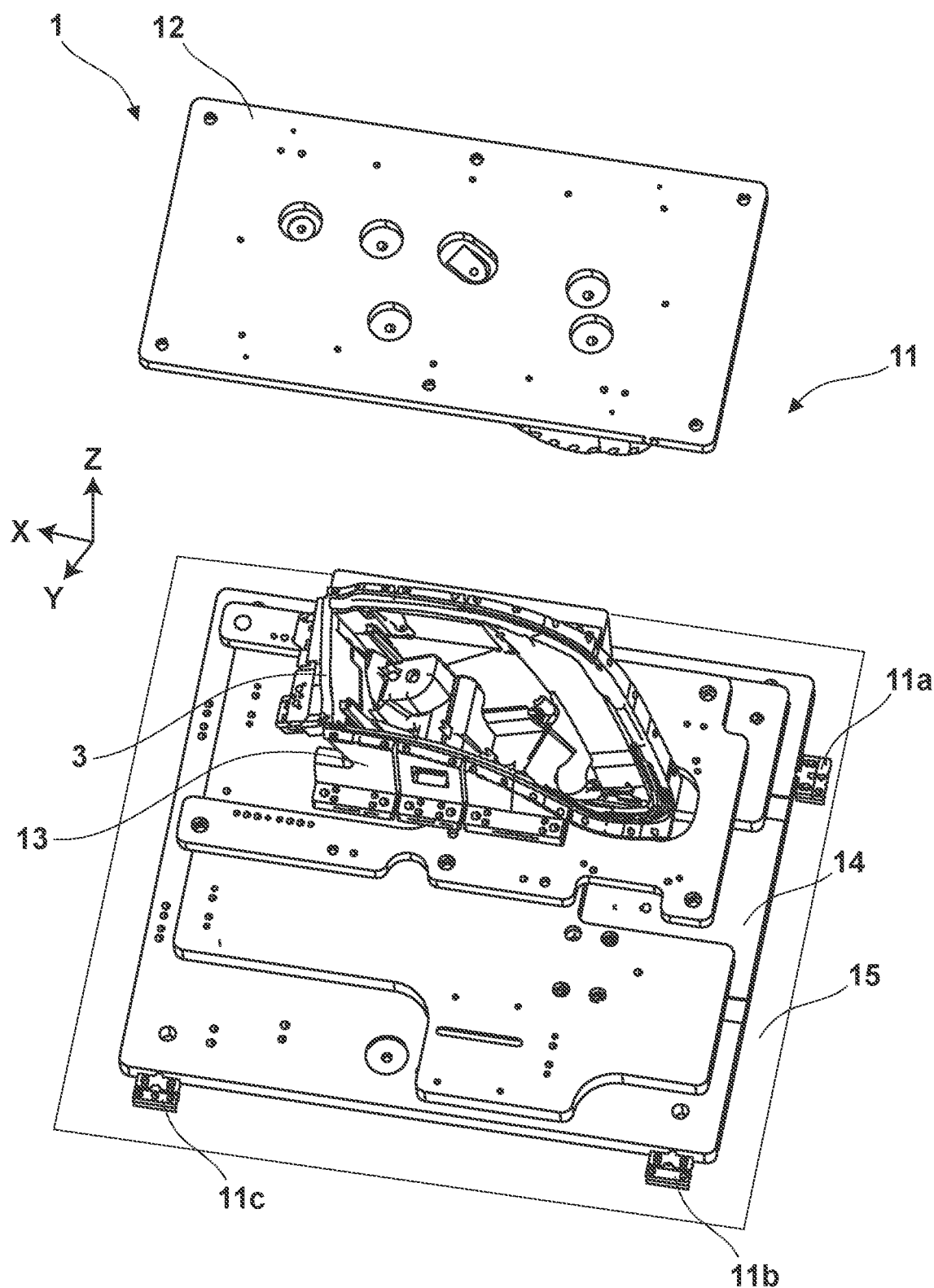
FIG. 1 is a partial view of a joining apparatus for carrying out the inventive setup and joining method.

FIG. 1 shows a partial view of a joining apparatus 1 for carrying out a friction welding process for joining a light lens to a housing of a lighting arrangement. The joining apparatus 1 comprises the base plate 14, on which the receiving device 13 is arranged for receiving a housing. The base plate 14 is arranged parallel to the horizontal plane stretched by X and Y. In the vertical direction Z thereto, the holding device 12 for the reception of a light lens is located above the base plate 14 on the underside facing the receiving device 13.

The holding device is movable along the vertical direction Z, wherein the adjuster 11 used for this purpose are not shown in more detail here, but can be designed, for example, as a portal system. Three fixing blocks 11a-c serve as adjuster 11 for the receiving device 13, by means of which the base plate 14 including the receiving device 13 can be moved in the X and Y direction and rotated to a limited extent in the X-Y plane. For this purpose, the fixing blocks 11a-c have, for example, slotted holes.

Figure 2:
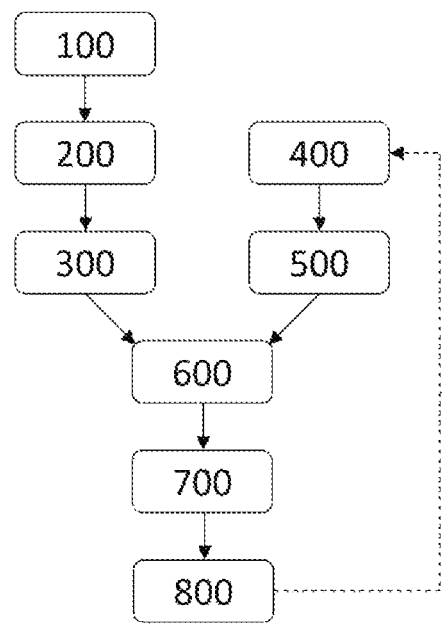
FIG. 2 is a flow diagram of the setup and joining method according to the invention.

FIG. 2 shows a flow diagram of the method steps of the setup and joining method according to the invention, wherein steps 100 to 700 represent the setup process. For the reference signs mentioned below concerning the joining apparatus and parts, reference is made to the description of FIGS. 1 and 3a-c.

The creation 100 of a first virtual model of the joining apparatus 1 with a light lens 2 received therein and with a housing 3 received therein, wherein the relative arrangement of the light lens 2 to the housing 3 corresponds to the target arrangement suitable for dimensionally accurate joining, is preferably based on already existing CAD data sets of the joining apparatus 1 and the two construction units 2, 3 to be joined. To quantify the relative arrangement, 2 receptor points are defined on the surface of the light lens and referenced to a reference point system on the housing 3. Commonly, gap and surface dimensions are specified, i.e., the relative position of each receptor point is determined by specifying, for example, two dimensions, and thus the relative arrangement of the light lens 2 to the housing 3 is quantified by the sum of all receptor points. A vector $\overline{B}=(B_1, \ldots, B_{2N})$ contains in pairs the gap and surface dimensions of N receptor points and thus represents the relative arrangement of the light lens 2 to the housing 3. In the model created in the first method step 100, the light lens 2 is in target arrangement $\overline{B}=\overline{B}^{(0)}$ to the housing 3 and the associated position $\overline{D}=(x, y_1, y_2, z)$ of the adjuster 11 is defined as a target position $\overline{D}^{(0)}=(x^{(0)}, y_1^{(0)}, y_2^{(0)}, z^{(0)})$. The elements x, $y_1$, $y_2$ and z represent in it the positions of the adjuster 11, i.e., of the three fixing blocks 11a, 11b and 11c as well as the adjuster designed to displace the holding device 12 in the Z direction, wherein in principle arbitrary and preferably practicable units, for example scale parts or the number of visible threads of an adjusting screw, can be used.

Starting from the first virtual model of the joining apparatus 1 with a light lens 2 in target arrangement to a housing 3, a large number of corresponding virtual models is created in the second method step 200, wherein in each case by virtual displacement $\overline{d}=(d_x, d_{y1}, d_{y2}, d_z)$ of the adjuster 11, the relative arrangement $\overline{B}$ of the light lens 2 to the housing 3 varies.

In the subsequent method step 300, a functional relationship between the relative arrangements $\overline{B}$ of the light lens 2 to the housing 3 and the associated displacement $\overline{D}$ of the adjuster 11 is set up on the basis of the virtual models, wherein this relationship is assumed to be linear. In the case of a purely translational displacement of the light lens 2 relative to the housing 3, this assumption is identically fulfilled, while with regard to a relative rotation it is only approximately valid in the limiting case of sufficiently small changes. The functional relationship corresponds to an inhomogeneous linear system with the displacement D as variables and the relative arrangement $\overline{B}$ as an absolute element, i.e., $\overline{A}*\overline{D}=\overline{A}*(\overline{D}^{(0)}+\overline{d})=\overline{B}$. The coefficients of the matrix $\overline{A}$ are determined in a simple manner by inserting concrete values for $\overline{D}$ and $\overline{B}$ into the linear system of equations, wherein such concrete values are obtained from the virtual models set up at the start.

In practice, after equipping the real joining apparatus 1 with holding and receiving device 2, 3, the adjuster 11 are in a starting position $\overline{D}^{(1)}$, which is usually not well defined, because, for example, the fixing blocks 11a-c are designed as pure tolerance compensating components. The method according to the invention is now aimed at determining the target displacement $\overline{d}^{(0)}$, by means of which the adjuster 11 can be transferred from the starting position $\overline{D}^{(1)}$ to the target position $\overline{D}^{(0)}$, i.e., the following applies: $\overline{D}^{(1)}-\overline{d}^{(0)}=\overline{D}^{(0)}$.

For this purpose, in method step 400, a test construction unit formed of a light lens 2 and a housing 3 is joined in the starting position $\overline{D}^{(1)}$ of the adjuster 11, and in the subsequent method step 500, the relative arrangement $\overline{B}^{(1)}$ of the light lens 2 is measured in this test construction unit.

The following then applies:

$$\overline{B}^{(1)} = \overline{A}*\overline{D}^{(1)} = \overline{A}*(\overline{D}^{(0)} + \overline{d}^{(0)}) = \overline{B}^{(0)} + \overline{A}*\overline{d}^{(0)},$$

and thus, the sought target displacement is:

$$\overline{d}^{(0)} = \overline{A}^{-1}*(\overline{B}^{(1)} - \overline{B}^{(0)}).$$

This calculation of the target displacement $\overline{d}^{(0)}$ is carried out in method step 600 using the coefficient matrix $\overline{A}$ determined in method step 300 or using a pseudoinverse $\overline{A}^{-1}$ of the specified target arrangement $\overline{B}^{(0)}$ of the light lens 2 to a housing 3 in a perfectly dimensionally accurate lighting arrangement and using the relative arrangement $\overline{B}^{(1)}$ of the light lens 2 in the test construction unit measured in method step 500. In the simplest case, the relative arrangement $\overline{B}$ can be defined only by N=2 receptor points, each of which is given by a gap and surface dimension. This has the advantage that the coefficient matrix $\overline{A}$ then assumes a square 4×4 shape and, in the calculation of the target displacement $\overline{d}^{(0)}$ therefore the ordinary inverse can be calculated in a mathematically simple way.

The setup method according to the invention ends with the method step 700, in which the adjuster 11 are displaced from the starting position $\overline{D}^{(1)}$ by the previously determined target displacement $\overline{d}^{(0)}$ such that the adjuster 11 then assume the target position $\overline{D}^{(0)}$, in which a light lens 2 can be joined to a housing 3 in the desired target arrangement $\overline{B}^{(0)}$.

On the apparatus side, the prerequisite for the production of dimensionally accurate lighting arrangements has thus been created with little time and effort.

The method step 800, the joining of a light lens 2 with a housing 3 in a target arrangement $\overline{B}^{(0)}$ represents in particular the start of a whole production series, during which, in the ideal case, it is no longer necessary to intervene in the present target position $\overline{D}^{(0)}$ of the adjuster 11. Any dimensional deviations of the lighting arrangements manufactured with it are then due in particular to the fact that the joined components, i.e., the light lens 2 and the housing 3, were already affected by dimensional scattering in the single-part production. One exception may be if the starting position $\overline{D}^{(1)}$ of the adjuster 11 deviates greatly from its target position $\overline{D}^{(0)}$ and the target displacement $\overline{d}^{(0)}$ causes such a pronounced rotation of the housing 3 received in the receiving device 13 to the light lens 2 that the linear approximation underlying the method step 300 is not valid. In this case, it is necessary to join and measure a further test construction unit and to update the target displacement $\overline{d}^{(0)}$ of the adjuster 11 on this basis. This operational procedure corresponds to a repetition of method steps 400 to 800 and is represented in FIG. 2 by the dashed arrow. If necessary, these steps are to be iterated so often that the position of the adjuster 11 has been brought close enough to their target position $\overline{D}^{(0)}$ that the calculation of the target displacement $\overline{d}^{(0)}$ is valid in linear approximation, or dimensionally accurate lighting arrangements are joinable with the prepared joining apparatus 1.

Figure 3A:
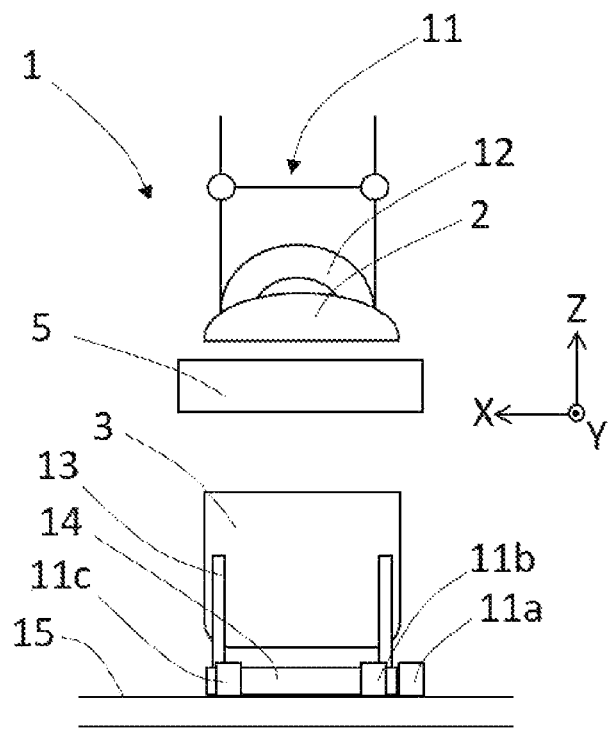
FIGS. 3a to 3c show schematic representations of method steps of the inventive setup and joining methods.
Figure 3B:
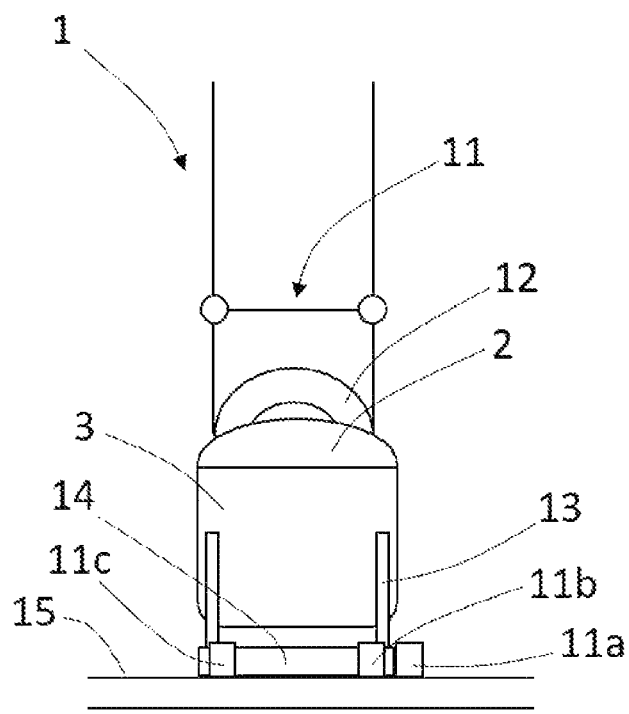
Figure 3C:
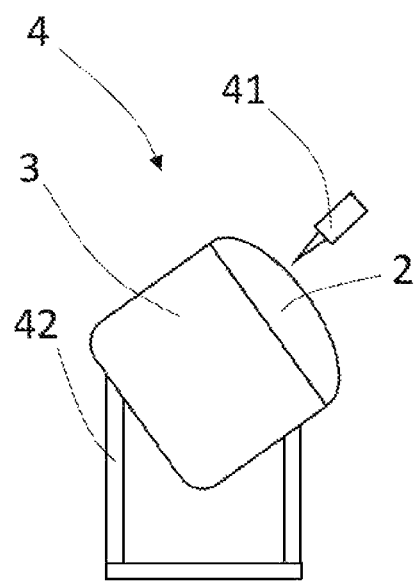

FIGS. 3*a*-*c* illustrate different method steps of the setup or joining method according to the invention. In FIGS. 3*a*-*b* various working steps of the joining process by means of a heating element welding device 1 are shown. The light lens 2 is received in the holding device 12 and the housing 3 in the receiving device 13. The adjuster 11 comprise the fixing blocks 11*a*-*c* as well as a device for the displacement of the holding device 2 along the vertical axis Z not further specified here. By means of the fixing blocks 11*a*-*c*, the base plate 14 including the receiving device 13 is movable on the base plate 15 in the X-Y plane and also rotatable to a certain extent.

In FIG. 3*a*, the holding device 12 is moved to a position far away from the receiving device 13, and the heating element 5 has been retracted into the gap between light lens 2 and housing 3. The heating element 5 is used to plasticize the joining surface on the light lens 2. The heat is introduced, for example, contactless by means of laser or infrared radiation or by means of hot gas. The resulting degree of plasticization of the joining surface of the light lens 2 is sufficiently large that a subsequent pressing of the joining surfaces of light lens 2 and housing 3 leads to the production of the desired joining connection. Alternatively, the joining surface of housing 3 can also be plasticized by means of heat input.

The pressing together of the two joining partners 2, 3 is shown in FIG. 3*b*. For the purposes of the method according to the invention, this may correspond either to the method step 400, i.e., the joining of a test component at a starting position of the adjuster 11, or the method step 800, i.e., the joining of a dimensionally accurate lighting arrangement at the target position of the adjuster 11.

Finally, FIG. 3*c* illustrates the method step 500, in which in particular a test construction unit formed of joined light lens 2 and housing 3 is measured in a coordinate measuring instrument 4. The test construction unit is received with the housing 3 in the measuring receptacle 42, so that position and spatial orientation of housing 3 in relation to the internal coordinate system of the coordinate measuring instrument 4 are specified and well known. the probe 41 hits defined receptor points on the surface of the light lens 4, thus determining their relative position in relation to the reference points on the housing 3. Each receptor point is usually assigned a gap and surface dimension and, from the sum of the measured points, the relative arrangement $\overline{B}$ of the light lens 2 to the housing 3 results.

The invention is not limited in its embodiments to the preferred embodiment given above. Rather, a number of variants are conceivable, which make use of the presented solution even with fundamentally different embodiments. All features and/or advantages resulting from the claims, the description, or the drawings, including structural details, spatial arrangements, and method steps, can be essential to the invention both by themselves and in the most diverse combinations.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for setting up a joining apparatus for joining a light lens to a housing of a motor vehicle lighting arrangement, wherein the joining apparatus comprises a holding device for receiving the light lens and a receiving device for receiving the housing, wherein the holding device and the receiving device are movable in translation and/or rotation relative to each other by an adjuster, the method comprising:
   creating a first virtual model of the joining apparatus with a light lens received therein and with a housing received therein, wherein the relative arrangement of the light lens to the housing corresponds to a target arrangement;
   creating a plurality of virtual models of the joining apparatus with the light lens received therein and with the housing received therein, wherein the relative arrangement of the light lens to the housing deviates from the target arrangement in each case by virtual displacement of the adjuster;
   calculating a functional relationship between the relative arrangements of the light lens to the housing and the displacement of the adjuster on the basis of the virtual models created;
   joining a light lens to a housing to form a test construction unit in a starting position of the adjuster;
   measuring the relative arrangement of the light lens to the housing in the test construction unit;
   calculating a target displacement of the adjuster on the basis of the functional relationship calculated and the relative arrangement in the test construction unit measured;
   displacing the adjuster from the starting position by the target displacement; and
   joining a light lens to a housing in the target arrangement by the displaced adjuster.

2. The method according to claim 1, wherein, when calculating the functional relationships between the relative arrangements of the light lens to the housing and the displacement of the adjuster, a linear approximation is carried out.

3. The method according to claim 2, wherein, when calculating the functional relationship, an inhomogeneous linear system is set up, wherein the variables of the linear system represent the displacement of the adjuster and the absolute elements of the linear system represent the relative arrangement of the light lens to the housing.

4. The method according to claim 3, wherein, when calculating the target displacement of the adjuster, the linear system is solved, wherein the absolute elements of the linear system represent the relative arrangement of the light lens to the housing in the test construction unit measured in the preceding method step.

5. The method according to claim 1, wherein, when creating the first virtual model, receptor points on the light lens and reference points on the housing are defined, wherein the relative arrangement of the light lens to the housing is described based on the relative position of the receptor points to the reference points.

6. The method according to claim 5, wherein when measuring the relative arrangement of the light lens to the housing, the relative positions of the receptor points on the light lens to the reference points on the housing are measured.

7. The method according to claim 1, wherein the displacement carried out by the adjuster corresponds to the following relative movements of the light lens received in the holding device to the housing received in the receiving device:

translation in the vertical direction (Z);

translation in two directions (X, Y) in a horizontal plane; and rotation about the vertical direction (Z) as an axis of rotation.

8. The method according to claim 1, wherein a device for carrying out a friction welding process or a heating element welding process or an adhesive process is used as a joining apparatus.

9. The method according to claim 1, wherein a coordinate measuring instrument is used for measuring the relative arrangement of the light lens to the housing.

10. A method for joining a light lens to a housing of a motor vehicle lighting arrangement by a joining apparatus, the method comprising:

setting up the joining apparatus using the method according to claim 1; and joining the light lens to the housing in a target arrangement.

\* \* \* \* \*